UNITED STATES PATENT OFFICE.

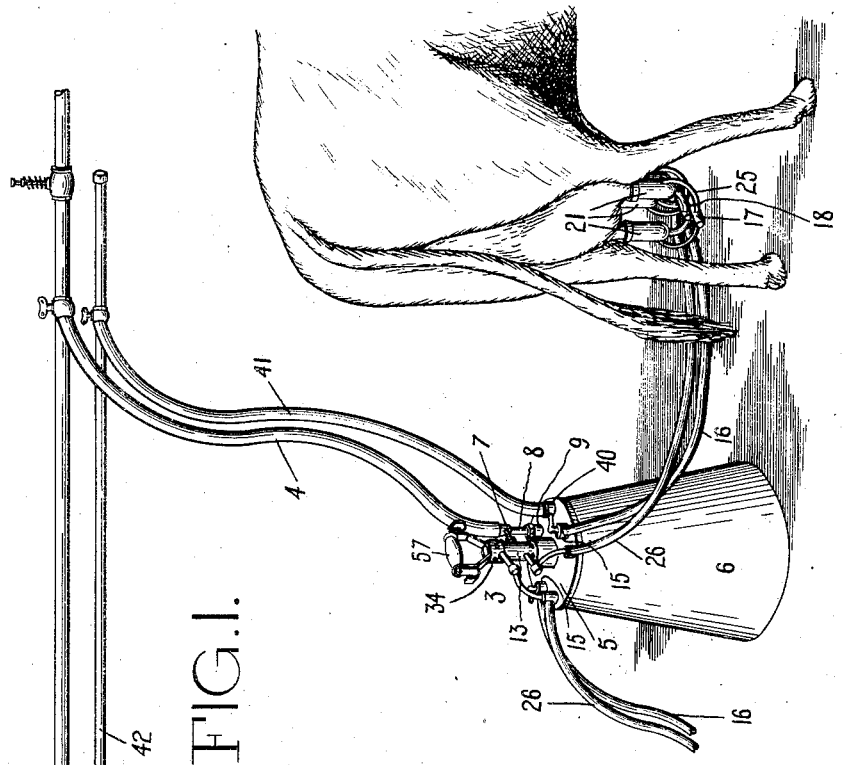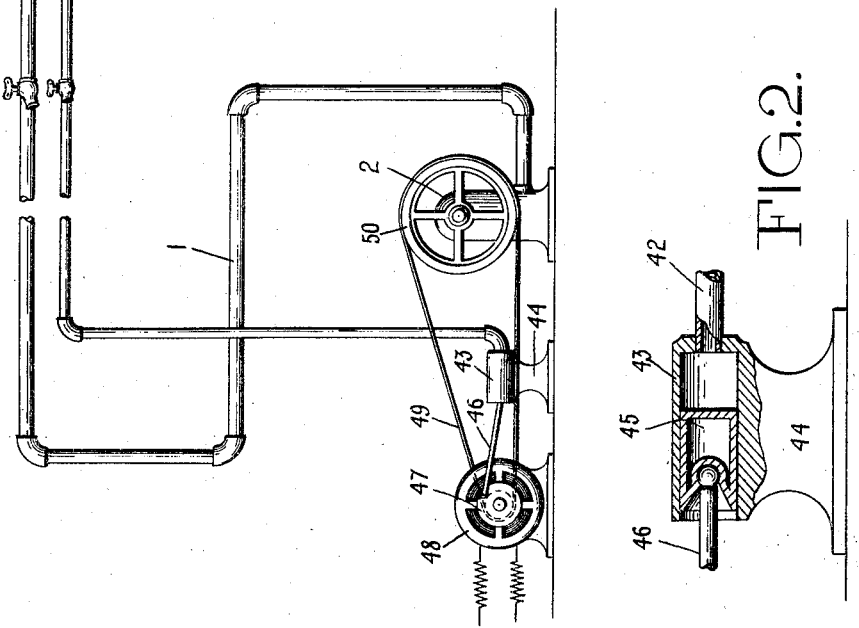

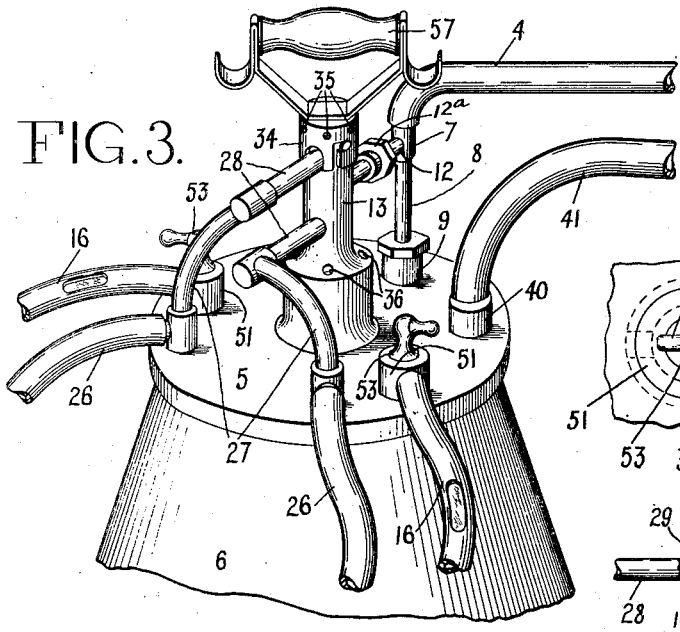
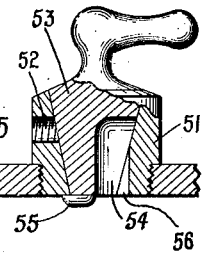
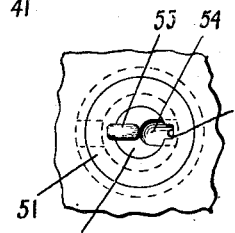
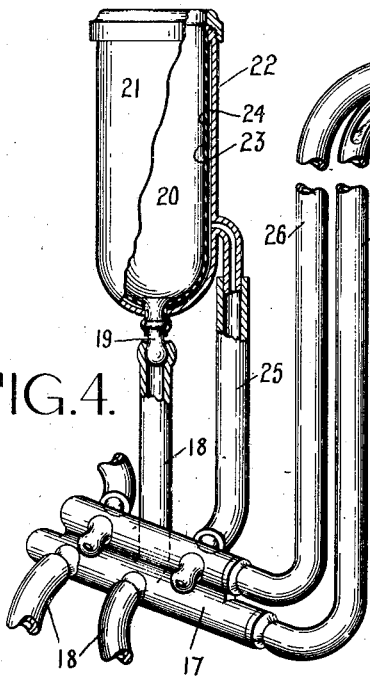
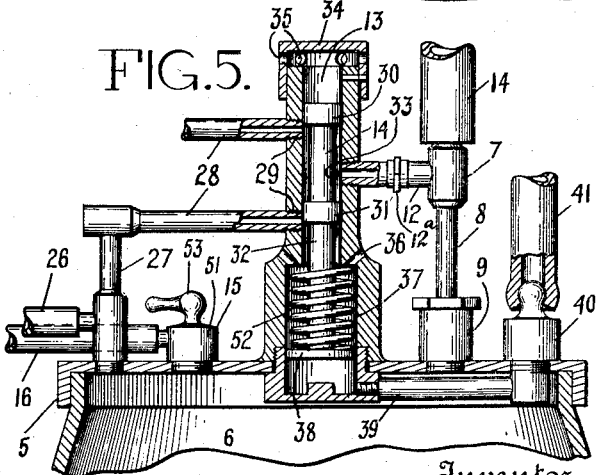

ARTHUR CHICHESTER MACARTNEY, OF BLOOMFIELD, NEW JERSEY, ASSIGNOR TO EMPIRE CREAM SEPARATOR COMPANY, OF BLOOMFIELD, NEW JERSEY, A CORPORATION OF NEW JERSEY.

APPARATUS FOR MILKING.

1,335,173.   Specification of Letters Patent.   Patented Mar. 30, 1920.

Application filed August 23, 1913. Serial No. 786,287.

*To all whom it may concern:*

Be it known that I, ARTHUR CHICHESTER MACARTNEY, a subject of the King of Great Britain, residing at Bloomfield, in the county of Essex and State of New Jersey, have invented certain new and useful Improvements in Apparatus for Milking, of which the following is a specification.

This invention relates to machines or apparatus for milking cows and particularly to improved means for operating the pressure or vacuum pulsating devices which form an element of most apparatus of this character. It is very important for the satisfactory operation of milking apparatus that the cow's teats be subjected to regular and uninterrupted pulsations of pressure or suction during the operation of milking in order to cause the milk to flow properly and to prevent injury to the cow. Various forms of mechanically or electrically driven pulsators have been suggested, but these are objectionable as requiring elaborate and expensive mechanism and also as interfering with the portability or free movement of the milking apparatus about the stable. It has also been proposed to pulsate the operating medium, vacuum or pressure throughout the entire system, but this arrangement has proved practically inoperative because of the impossibility of producing pulsations with sufficient rapidity and of the required positiveness and amplitude to act directly upon the teats, throughout the large spaces and volumes required to be affected. I overcome all of these and other objections by providing a positively pulsated fluid system for operating local pulsator mechanisms which in turn control the action of the main teat cup operating medium.

In the drawings accompanying and forming a part of this specification:

Figure 1 is a diagrammatic view of an apparatus embodying one application of my invention, and showing one milking unit provided with attachments for milking two cows, one of the attachments being shown applied to a cow. It is to be understood that a number of milking units similar to that indicated may, and usually will be attached to the mains shown.

Fig. 2 is a detail view of the pulsator pump or master pulsator showing the cylinder in section.

Fig. 3 is a perspective view of the milk pail cover and parts carried thereby and the upper part of a milk pail.

Fig. 4 is a vertical section through the milk pail cover and upper part of the pail and parts carried by the cover including the pulsator valve. This view also shows diagrammatically one of the teat cups connected to the pipes from the pail, a part of the cup being shown in section.

Fig. 5 is a view similar to Fig. 4 showing the pulsator valve in another position.

Fig. 6 is a section and Fig. 7 a bottom plan view of an improved form of milk cock.

The present invention relates primarily to that part of a milking system by which the pressure or suction in the teat cups or attachments is pulsated, and it is particularly applicable to the production of this action in multiple chambered cups using either pressure or suction or both. In the particular embodiment of my invention illustrated I employ a two chambered teat cup, the inner chamber of which receives the cow's teat and is subjected to a constant suction. The chambers are separated by a flexible lining or "inflation." The chamber of the teat cup outside of this lining is subjected to intermittent suction which permits the flexible lining to engage and support the teat owing to the vacuum in the inner chamber when air at atmospheric pressure is admitted to the outer chamber, and releasing the lateral pressure upon the teat when the suction is equalized on the two sides of the lining. The particular teat cup illustrated embodies certain features of improvement which I have made the subject of another application filed of even date herewith, Serial No. 786,286, and no claim is therefore made to this construction herein. The present invention is in no way limited to this particular form of teat cup.

Referring to the drawings in detail the numeral 1 designates a pipe or main for the teat cup operating medium which extends through the stable or place where the milking is to be carried on. In this instance the operating medium is a vacuum which is constantly maintained in this pipe by any suitable means, as for instance by an air pump 2. The milking units 3 of which but one is shown in Fig. 1 are connected to the main 1 at desired intervals and in any suitable manner, preferably by means of a flexible pipe or hose 4. Each milking unit is preferably mounted directly upon the cover 5 of a milk pail 6, but this arrangement is not essential. In the construction illustrated the pipe 4 is connected to one branch of a T 7, from another branch of which a pipe 8 extends to the casing 9 mounted upon the milk pail cover and communicating with the interior of the pail through a passage 10. Within the casing 9 is a check valve 11 which is normally held off its seat by the suction in pipe 4, so that air may be exhausted from the interior of the pail through the passage 10. A tight connection is established between the pipe or branch 8 and the casing by means of the threaded cap 9$^a$ which engages a flange 8$^a$ at the lower end of the branch 8 and seated on a washer 9$^b$. By unscrewing this cap and removing it with the branched T 7, and washer 9$^b$, ready access is obtained to the check valve casing to permit cleaning of its interior, the passage 10, and the valve 11. The frequent cleaning of these parts is important as more or less milk vapor will be carried into the check valve casing by the air passing up through the passage 10. When the pail is to be removed and the hose 4 is disconnected from the T 7 or from the main 1, thus cutting off the suction, the check valve immediately drops upon its seat and thus prevents the inrush of stable air into the pail and consequent contamination of the milk. The check valve also prevents the breaking of the vacuum in the pail, such vacuum being generally utilized to hold the pail cover firmly in position. The T 7 has a branch 12, which connects with a chamber 13 in which works the pulsator valve 14 to be later described, a union 12$^a$ being preferably utilized to establish the connection so as to facilitate the assembling and detachment of the T. The constant vacuum maintained within the pail is communicated to the inner chamber of each of the teat cups through a plug cock 15 and a flexible hose 16. The cock or valve 15 may be of any suitable construction but is preferably of such a nature that it may be readily taken apart for cleaning. I have found the structure illustrated in Figs. 6 and 7 particularly satisfactory for use in this connection. This form of cock comprises but two members, a casing 51 having a milk port 52, and a plug 53 having a milk passage 54 formed in one side thereof. The plug is provided with a lug or key 55 adapted to interlock with the casing except in one position of the plug, in which position such key registers with a slot 56 in the valve seat. When in this position the plug may be freely lifted out to permit the valve to be cleaned. The key and slot are preferably so positioned as to prevent removal of the plug except when the passage 54 registers with the port. The parts occupy the latter position when the apparatus is actually performing the milking operation, at which time the milking unit usually stands stationary and there is little danger of the plug being displaced. At all times when the milking is not actually in progress however, as when the milking unit is being moved from one cow to another, the cock is turned off and the plug is therefore locked firmly on its seat by the key 55. It is during the moving of the apparatus that the plug unless firmly held in position is most likely to fall or be knocked out of its socket and it is also at this time that such an occurrence is most annoying. This will be readily appreciated when it is understood that the vacuum in the milk pail is commonly relied upon to hold the cover in place thereon and that a handle upon the cover, such as is indicated at 57 in Figs. 1 and 3, for instance, is usually used to move the pail from place to place. If the plug is lifted from its seat while the pail is being carried by such a handle, the vacuum will be at once broken, the pail will drop from the cover, and its contents most probably be spilled.

The hose 16 is connected to a claw or manifold 17 which distributes the suction through the branch pipes 18 and nipples 19 to the inner chambers 20 of the teat cups 21. The teat cup illustrated in Fig. 4 has an outer substantially rigid casing 22 within which is secured a flexible lining of suitable material such as rubber or rubber and fabric 23. In order to cause the lining 23 alternately to collapse and expand so as to engage and release the teat, suction and atmospheric pressure are alternately permitted to enter the outer chamber 24 of the cup between the lining 23 and the casing 22. For this purpose a connection is made from the chamber 24 of each cup through the branch pipes 25, the claw 17, flexible hose 26 and pipes 27 and 28 to the valve chamber 13. This valve chamber has one or more ports 29 communicating with a corresponding number of pipes 28, the number of these ports and pipes depending upon the number of cows which the milking unit is designed to take care of. As shown each milking unit is intended to milk two cows and therefore the valve chamber is provided with two ports 29 and the corresponding connections to two flexible pipes 26, and two flexible pipes 16 with the corresponding claws and teat cups. The pulsator valve shown in Figs. 4 and 5 comprises two heads 30 and 31 which fit the valve chamber closely and are connected by a stem 32 of less diameter than the valve chamber so as to provide a space 33 between the heads and around the stem. The branch 12 of the T 7 is always in communication with this space so that a vacuum is constantly maintained therein. The upper end of the valve chamber above the head 30 is preferably covered by a cap 34, which prevents dirt from entering the chamber, but which is provided with a series of holes 35 to permit air at atmospheric pressure to enter freely this part of the chamber. Atmospheric pressure is maintained in the chamber below the head 31 through a series of holes 36 in the walls of the chamber. As the valve 14 is moved up and down in the chamber it alternately opens the ports 29 to the vacuum within the space 33 and to the atmosphere. Fig. 4 shows the valve in its lower position in which the upper port 29 is partly uncovered so as to permit air at atmospheric pressure to enter the upper pipe 28 and pass to the chambers 24 of the teat cups communicating therewith. At the same time the lower port 29 is open to the vacuum in the space 33 so that air is exhausted through the lower pipe 28 and its connections from the chambers 24 of the other group of teat cups. Fig. 5 shows the valve moved to its upper position in which the upper port 29 is open to the vacuum and the lower port 29 to atmospheric pressure, thus applying the vacuum to the chambers 24 of the first group of teat cups so as to relieve the pressure upon the teats of the cow being milked and admitting atmospheric pressure to the second group of teat cups so as to compress and support the teats of the second cow. Thus the vacuum in the outer chambers of the teat cups is pulsated.

The means for shifting the pulsator valve so as to pulsate the vacuum in the teat cups and which constitutes the chief feature of my invention will now be described. For this purpose the pulsator valve has connected to it a suitable fluid operated actuating device, which is connected through suitable ducts to a positively driven master pulsator or pulsator pump, the action of which can be definitely controlled. As shown in the drawings, the valve stem 32 of the pulsator valve is extended into a cylinder 37 which in the present instance forms a part or extension of the casing of the pulsator valve and is mounted directly upon the pail cover 5. The lower end of this valve stem has mounted upon it a piston 38 which works in this cylinder. Air is admitted to this cylinder beneath the piston through a suitable connection, which in the form of apparatus shown, comprise a pipe 39, an elbow 40 passing through the milk pail cover and the flexible hose 41, which connects the elbow 40 with the pulsator main 42 shown in Fig. 1. The pulsator main 42 communicates with the cylinder 43 of the master pulsator or pulsator pump 44. The air in the cylinder 43 is intermittently compressed, or alternately compressed and rarefied by a piston or plunger 45, which reciprocates therein. This plunger may be caused to reciprocate by any suitable means which permit of its regular and predetermined operation. Preferably this plunger is mechanically driven from a motor or rotating shaft, the speed of which may be controlled, and which operates to positively reciprocate the plunger at a predetermined uniform rate. As shown in the drawings, the plunger is driven by means of a pitman 46 and crank disk 47 mounted on the shaft of a motor 48, which is shown for purposes of illustration as an electric motor. This same motor is utilized to drive the vacuum pump 2 through a belt 49 and pulley 50. It is obvious that this specific means for driving the master pulsator is not essential nor need the pulsator and vacuum pump be driven by the same motor although this is usually found to be a convenient arrangement. The end of the cylinder 43 with which the pipe 42 is connected is preferably closed, except for this pipe, while the other end of the cylinder is preferably open. As the piston or plunger 45 moves toward the end of the cylinder to which the pipe 42 is connected, it compresses the air within the cylinder and pipe, which pressure is transmitted through the hose 41 and connections to the space beneath the piston 38. This pressure raises the piston and shifts the pulsator valve from the position shown in Fig. 4 to that shown in Fig. 5, thus pulsating the vacuum in the teat cups as already described. When the plunger 45 moves away from the end of the cylinder 43, it relieves the pressure or rarefies the air therein, in the latter case causing a partial vacuum in the pipe 42, which is transmitted to the cylinder 37 and which tends to draw the piston 38 back to the position shown in Fig. 4. While the vacuum created by this movement of the plunger 45 may be sufficient to draw the piston down with the desired quickness, this movement of the piston is preferably assisted by means of a spring 52, placed within the cylinder 37 and bearing upon the piston 38. This spring or other suitable means may be designed if desired to do all the work of returning the piston to its original position, in which case the creation of any vacuum in the cylinder 43 and pipe 42 is unnecessary. It will thus be seen that for every reciprocation of the plunger 45 of the master pulsator, the pulsator valve of each milking unit is correspondingly reciprocated. Any number of milking units may be connected to the pipes 16 and 42 and the pulsator valves of all will be driven in definite timed relation with the movements of the master pulsator. There are no automatic motors for the several milking units, which are likely to get out of order, and one of the milking units cannot fail to operate while the remainder perform their work. Thus the danger, which is always present in milking machines using such alleged automatic pulsators, that the operator may overlook the fact that one or more of the pulsators are not functioning correctly, and thus that permanent injury may be occasioned to some of the cows, is avoided. Moreover a proper rate of pulsation of all the milking units is assured and this rate is at all times under the control of the person in charge of the plant and need not be left to the supervision of the hands operating the different milking units, who are often inexperienced and careless. The portability of the milking units is in no way interfered with by my apparatus as the pulsations are transmitted to each unit through a flexible pipe, just as the constant vacuum is transmitted. As the work to be performed by the impulses transmitted through the pipe 42 consists only in shifting the pulsator valves 14, the pipe 42 may be of small diameter and consequently a comparatively small master pulsator may be utilized to compress or rarefy the air in the pipe. The small volume of the air in the pipe 42 and its connections permits of rapid and positive transmission of impulses to the pulsator mechanisms throughout all parts of the system, and milking units remote from the master pulsator may be operated as effectually as those near by. The apparatus is extremely economical in operation and in fact the master pulsator requires almost no power to drive it as the force utilized to move its plunger in one direction to compress the air in the pulsator system is largely returned by the expansion of the air in the system upon the return stroke of the plunger. The only energy consumed is the negligible quantity required to overcome the friction of the parts.

I have illustrated in the drawings and described in detail a form of apparatus which I have found well adapted to carrying out my invention but I do not thereby intend to limit myself to such specific apparatus, but intend to cover the application of the principles of my invention broadly.

I claim:

1. A milking machine unit comprising the combination of a milk pail, a removable cover thereon, an upright casing mounted on the cover and having vertical bores therein, a pulsator valve working in one of said bores, a piston working in the other bore, a stem connecting said piston and valve, means for varying the pressure in said cylinder to operate said piston and a vacuum pipe having two branches, one of which is connected to a port in the cover of the milk pail and the other to a port in the portion of the casing in which the pulsator valve works, said second branch extending from the vacuum pipe to said casing above and free from said cover.

2. A milking machine unit comprising the combination of a milk pail, a removable cover thereon, an upright casing mounted on the cover and having vertical bores therein, a pulsator valve working in one of said bores, a piston working in the other bore, a stem connecting said piston and valve, means for varying the pressure in said cylinder to operate said piston, and a vacuum pipe having two branches, one of which is connected to a port in the portion of the casing in which the pulsator valve works, a casing mounted on top of the cover having an outwardly opening check valve therein governing access to the interior of the pail, the second branch of said vacuum pipe leading to said check valve casing.

3. A milking machine unit comprising the combination of a milk pail, a removable cover thereon, ports in said cover, one of which is governed by an outwardly opening check valve and the other by a milk cock, an upright casing mounted on the cover and having alined bores therein, a pulsator valve working in one of said bores, a piston working in the other of said bores, a stem connecting said piston and valve, a vacuum pipe having a branch connected to a port in said casing and a branch connected to said check valve, a teat cup manifold, multiple chambered teat cups connected to said manifold, a pipe connecting one branch of said manifold with a port in said casing and a pipe connecting the other branch of said manifold with said milk cock.

4. A milking machine unit having a milk receptacle and a vacuum retained cover, a milk pipe leading to said receptacle, and a milk cock in said pipe, said cock comprising a casing and a plug provided with interlocking parts, said parts being formed to permit removal of said plug when in one position but preventing such removal when the plug is in other positions.

5. A milking machine unit having a milk receptacle and a vacuum retained cover, a milk pipe leading to said receptacle and a milk cock in said pipe, said cock comprising a casing having a taper seat with a slot at one side thereof, and a taper plug fitting said seat, said plug having a key adapted to pass through said slot when said plug is turned to open position and to interlock with the casing when the plug is turned in any other position.

6. A milk pail lid having mounted thereon a pulsator housing and milk cocks, and having a vacuum port therein, said pulsator housing including a lower portion of greater diameter containing a power device for operating the pulsator valve and another portion of smaller diameter containing pulsator valve devices, said casing having an air inlet at the upper end thereof, a vacuum pipe having a connection to the vacuum port in the pail lid and a connection to the side of the pulsator housing, and connections from the side of the pulsator housing to teat cups.

7. In a milking machine the combination of a vacuum main, a pulsation line, a primary pulsator for creating pneumatic pulsations in said pulsation line, a milk receptacle, a vacuum connection from said vacuum main to said receptacle, double chambered teat cups, a milk connection from the inner chambers of said cups to said milk receptacle, a pulsator housing having a reciprocating valve therein and pressure responsive means for actuating said valve, a fluid pressure connection from said pulsation line to said housing, so that pneumatic pulsations in said line will be transmitted to said housing to act upon said pressure responsive means and cause the same to reciprocate said pulsator valve, a connection between the pulsator housing the vacuum main, the pulsator housing having a plurality of ports therein adapted to be placed in communication with the source of vacuum in alternating succession by the reciprocations of the pulsator valve, connections between the outer chambers of some of the teat cups and one of said ports, and connections between the outer chambers of others of the teat cups with the other of said ports, whereby said teat cups will be pulsated alternately, the vacuum connections to the outer teat cup chambers being wholly independent of the milk connections of the inner chambers of the cups whereby the milk will pass to the milk receptacle without contamination by air drawn from the outer teat cup chambers.

8. A milk pail lid having a pulsator housing and a check valve housing thereon, a removable cap for the check valve housing, and a vacuum pipe connection having three branches, one for the attachment of a vacuum hose, a second branch removably connected to the check valve housing by the removable cap for said housing and the third branch communicating with the pulsator housing.

9. A milk pail lid having a pulsator housing and a check valve housing thereon, an outwardly opening check valve in said check valve housing, a perforated screw cap adapted to screw to the upper end of said check valve housing and a vacuum connection adapted to have a vacuum pipe attached thereto, said connection having a branch secured to the check valve housing by the screw cap thereof, and having another branch connected with the pulsation housing by a detachable connection.

10. A milk pail lid having a pulsator housing and a check valve housing thereon, an outwardly opening check valve in said check valve housing, a vacuum connection having means for the attachment of a vacuum hose and having a branch communicating with said check valve housing and another branch communicating with said pulsator housing, and a detachable connection between each of said branches and the respective housing with which it communicates.

11. A milk pail lid having a pulsator housing and a check valve housing thereon, an outwardly opening check valve in said check valve housing, a screw cap for said check valve housing, a vacuum connection having a flanged end engaged by said screw cap and connected by the latter to the check valve housing, said vacuum connection having means for the attachment of a vacuum hose and having a lateral branch separably connected with the pulsator housing.

12. A milk pail lid having a pulsator housing and a check valve housing thereon, an outwardly opening check valve in said check valve housing, a removable vacuum pipe connection having its lower end detachably connected with said check valve housing and extending upwardly therefrom and formed at its upper end for engagement with a vacuum hose, said pipe connection having a branch between its ends communicating with said pulsator housing.

In witness whereof I have hereunto set my hand in presence of two subscribing witnesses this 22d day of August, 1913.

ARTHUR CHICHESTER MACARTNEY.

Witnesses:
   EDMUND QUINCY MOSES,
   P. FRANK SONNEK.